US008836926B2

(12) United States Patent
Zoladz, Jr. et al.

(10) Patent No.: US 8,836,926 B2
(45) Date of Patent: Sep. 16, 2014

(54) OPTICAL DETECTOR ARRANGEMENT FOR DOCUMENT ACCEPTOR

(75) Inventors: Edward M. Zoladz, Jr., West Chester, PA (US); John D. Snider, West Chester, PA (US)

(73) Assignee: MEI, Inc., Malvern, PA (US)

( * ) Notice: Subject to any disclaimer, the term of this patent is extended or adjusted under 35 U.S.C. 154(b) by 979 days.

(21) Appl. No.: 12/377,885

(22) PCT Filed: Aug. 22, 2007

(86) PCT No.: PCT/US2007/076556
§ 371 (c)(1),
(2), (4) Date: Jun. 2, 2010

(87) PCT Pub. No.: WO2008/024863
PCT Pub. Date: Feb. 28, 2008

(65) Prior Publication Data
US 2010/0259749 A1    Oct. 14, 2010

Related U.S. Application Data

(60) Provisional application No. 60/823,221, filed on Aug. 22, 2006.

(51) Int. Cl.
*G06K 9/74* (2006.01)
*G07D 7/12* (2006.01)
*F21V 8/00* (2006.01)

(52) U.S. Cl.
CPC ............. *G07D 7/121* (2013.01); *G02B 6/0018* (2013.01); *G02B 6/0038* (2013.01)
USPC ........................................................... 356/71

(58) Field of Classification Search
CPC .... G07D 7/121; G02B 6/0018; G02B 6/0036; G02B 6/0038; G02B 3/0006; G02B 3/08; G02B 3/0062; G02B 3/0068
USPC .................. 356/4.05, 122–123, 71, 429–431; 250/216, 556
See application file for complete search history.

(56) References Cited

U.S. PATENT DOCUMENTS

| 5,676,453 | A | 10/1997 | Parkyn et al. |
| 5,855,268 | A | 1/1999 | Zoladz |
| 5,875,259 | A | 2/1999 | Mennie et al. |
| 5,905,583 | A | 5/1999 | Kawai et al. |

(Continued)

FOREIGN PATENT DOCUMENTS

| EP | 1 139 015 A1 | 4/2001 |
| EP | 1 452 908 A1 | 9/2004 |

(Continued)

*Primary Examiner* — Gregory J Toatley
*Assistant Examiner* — Rufus Phillips
(74) *Attorney, Agent, or Firm* — Mintz Levin Cohn Ferris Glovsky & Popeo, P.C.

(57) ABSTRACT

A sensor arrangement for a banknote validator or other document acceptor using optical transmissive measurements includes at least one light source located on a first side of a document path and arranged to transmit light around the document path to a second side of the document path, the second side being opposite the first side. Optical detectors are located on the first side of the document path and arranged to receive light sent from the light source and passing through the document transport path.

50 Claims, 12 Drawing Sheets

(56) References Cited

U.S. PATENT DOCUMENTS

| | | | |
|---|---|---|---|
| 5,923,413 A | 7/1999 | Laskowski | |
| 6,044,952 A * | 4/2000 | Haggerty et al. | 194/207 |
| 6,069,969 A * | 5/2000 | Keagy et al. | 382/124 |
| 6,172,745 B1 | 1/2001 | Voser et al. | |
| 6,259,100 B1 * | 7/2001 | Cross | 250/375 |
| 6,512,600 B1 | 1/2003 | Kawai et al. | |
| 6,648,221 B2 | 11/2003 | Thawley et al. | |
| 6,819,409 B1 | 11/2004 | Tompkin et al. | |
| 6,926,201 B2 | 8/2005 | Numata | |
| 6,994,203 B2 | 2/2006 | Zoladz, Jr. et al. | |
| 7,274,032 B2 | 9/2007 | Mosteller et al. | |
| 2002/0041349 A1 | 4/2002 | Ohkawa | |
| 2002/0159044 A1 | 10/2002 | Mei et al. | |
| 2003/0089776 A1 | 5/2003 | Hennick et al. | |
| 2004/0125358 A1 | 7/2004 | Numata | |
| 2004/0218114 A1 | 11/2004 | Lee et al. | |
| 2005/0217969 A1 | 10/2005 | Coombs et al. | |
| 2005/0286123 A1 | 12/2005 | Abu-Ageel | |
| 2006/0152931 A1 | 7/2006 | Holman | |

FOREIGN PATENT DOCUMENTS

| | | |
|---|---|---|
| JP | S62147325 A | 7/1987 |
| JP | S62147587 A | 7/1987 |
| JP | H1114753 A | 1/1999 |
| WO | 2004/013817 | 2/2004 |
| WO | 2005/109352 | 11/2005 |

* cited by examiner

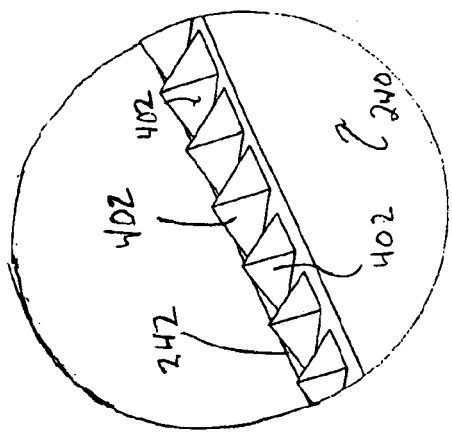
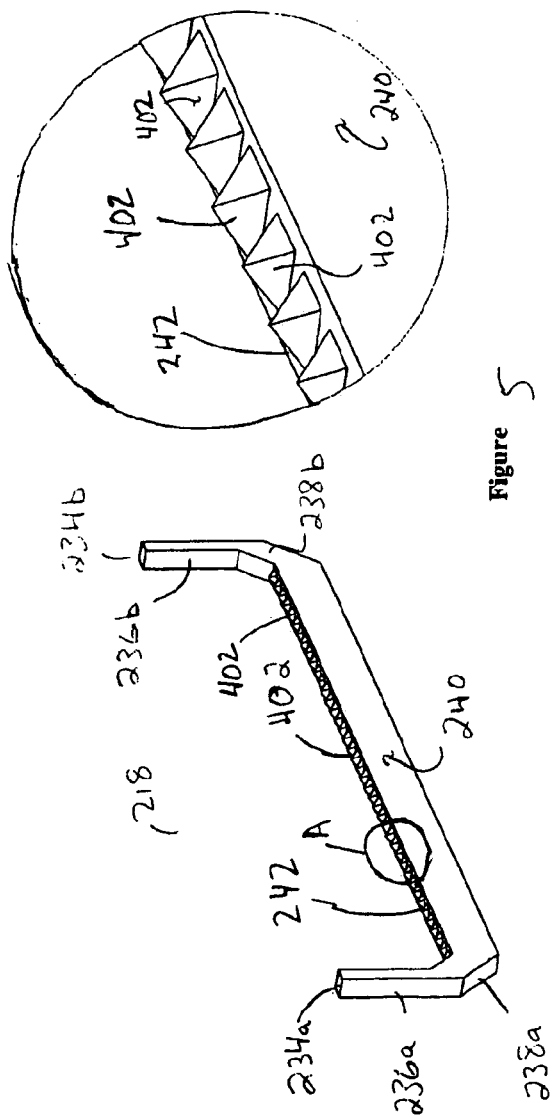
Figure 5
Figure 4

OPTICAL DETECTOR ARRANGEMENT FOR DOCUMENT ACCEPTOR

CROSS-REFERENCE TO RELATED APPLICATION(S)

This application is a national phase filing under 35 U.S.C. §371 of International application number PCT/US2007/076556, filed Aug. 22, 2007, which claims priority from U.S. Provisional application number 60/823,221 filed Aug. 22, 2006. The contents of the prior applications are incorporated herein by reference.

TECHNICAL FIELD

This disclosure relates to an optical detector arrangement and, more particularly to an optical detector arrangement for a document acceptor, such as a currency validator.

BACKGROUND

Document acceptors, such as those used in the vending and gaming industries, typically contain sensing means to detect the physical presence of a document (e.g., a bill) being processed, or to detect the transitional state of movable elements in the machine. An effective and widely-used type of sensing means is an optical sensing means, which may include a light source and a light receiver. Such sensors typically have no moving parts and do not require physical contact with the object being sensed in order to function properly.

Such sensors sometimes generate signals corresponding to the light transmitted through a document as it moves past. Those signals are processed to determine certain information, such as the position of the document in the passageway and the authenticity of the document. To make such determinations, the signals are compared to data stored in memory that corresponds to genuine bills.

SUMMARY OF THE INVENTION

In one aspect, a document validator or a sensor arrangement for a document acceptor using optical transmissive measurements includes at least one light source located on a first side of a document path and arranged to transmit light around the document path to a second side of the document path. The second side is opposite the first side. Optical detectors are located on the first side of the document path and are arranged to receive light sent from the light source and that passes through the document path.

In some implementations, the sensor arrangement includes one or more printed circuit boards on the first side of the document path and the light source(s) and optical detectors are mounted to the printed circuit board(s). Indeed, the light source(s) and the optical detectors may be mounted to the same printed circuit board.

Typically, the light source(s) are arranged such that, with a document in the document path, light transmitted by the light source to the second side of the document path reaches the second side of the document path substantially without passing through the document.

A light pipe assembly may be located on the second side of the document path and arranged to receive light from the light source(s) and transmit light through a document in the document path, if such a document is present in the document path.

In another aspect, a document validator or a sensing arrangement for a document acceptor includes a light source, optical detectors and an array of fresnel lenses. The array of fresnel lenses includes a first fresnel structure on a first side of the array and a second, orthogonal fresnel structure on a second side of the array. The first fresnel structure extends continuously across substantially an entire length of the array. The second fresnel structure has fresnel segments. Each fresnel segment, corresponds to one of the plurality of optical detectors. Light from the light source passes through the array of fresnel lenses to the optical detectors.

In some implementations, the array of fresnel lenses is arranged to anamorphically distort light that passes through the array. In some implementations, the array of fresnel lenses is arranged to anamorphically compress light that passes through the array. Typically, each of the first and second fresnel structures respectively includes a convex central region, a first set of teeth that extends across the array on a first side of the convex central region and a second set of teeth that extends across the array on a second side of the convex central region. Typically, the first side of the fresnel lens array substantially faces the optical detectors.

In yet another aspect, a light pipe assembly includes a first light input port at a first end of the light pipe assembly, a light emitting surface that extends substantially from the first end to a second end of the light pipe assembly and surface features in the light emitting surface. Each surface feature defines a first internally reflective boundary at a far end of the surface feature relative to the first light input port. Light that enters the first input port is directed to the first internally reflective boundaries. One or more reflective surfaces are arranged to reflect light from the first internally reflective boundaries through the light emitting surface. The first internally reflective boundaries vary in size across the light emitting surface. In some implementations, the first internally reflective boundaries increase in size from the first end of the light pipe assembly to the second end of the light pipe assembly.

In some implementations, the light pipe assembly also includes a second light input port at the second end of the light pipe assembly. In those implementations, each surface feature in the light emitting surface defines a second internally reflective boundary at a far end of the surface feature relative to the second light input port. Light that enters the second light input port is directed to the second internally reflective boundaries. The one or more reflective surfaces reflect light from the second internally reflective boundaries through the light emitting surface. The second internally reflective boundaries vary in size across the light emitting surface. In some implementations, the second internally reflective boundaries increase in size from the second end of the light pipe assembly to the first end of the light pipe assembly.

In some implementations, the surface features have substantially trapezoidal bases with, for example, a pair of substantially parallel sides, one of which is longer than the other. The first and second internally reflective boundaries may be arranged to substantially totally internally reflect the light from the first and second light input ports, respectively. According to some implementations, the first and second input ports and the light emitting surface are arranged such that light enters the first or second input ports from a first direction and exits the light emitting surface in a second direction, opposite the first. The reflective surfaces may be adapted to diffusely reflect light. In some implementations, the surface features are substantially pyramid-shaped.

Some implementations include multiple first light input ports at the first end of the light pipe assembly and/or multiple second light input ports at the second end of the light pipe assembly.

In still another aspect, a document validator includes one or more light sources, a light pipe assembly, a lens arranged to at least partially collimate light that is emitted from a light emitting surface of the light pipe assembly and optical detectors arranged to receive the at least partially collimated light. The light pipe assembly includes a first light input port at a first end thereof. The first light input port is arranged to receive light from one of the light sources. A light emitting surface extends substantially from the first end to a second end of the light pipe assembly. Surface features are formed in the light emitting surface. Each surface feature defines a first internally reflective boundary at a far end of the surface feature relative to the first light input port. Light that enters the first input port is directed to the first internally reflective boundaries and to one or more reflective surfaces arranged to reflect light from the first internally reflective boundaries through the light emitting surface. The first internally reflective boundaries vary in size across the light emitting surface.

In some implementations, the document validator also has a second light input port at the second end of the light pipe assembly. The second light input port is arranged to receive light from a second one of the light sources. Each surface feature in the light emitting surface defines a second internally reflective boundary at a far end of the surface feature relative to the second light input port. Light that enters the second light input port is directed to the second internally reflective boundaries and the one or more reflective surfaces reflect light from the second internally reflective boundaries through the light emitting surface. The second internally reflective boundaries vary in size across the light emitting surface.

Some implementations include multiple first light input ports at the first side of the light pipe assembly and/or multiple first light input ports at the second side of the light pipe assembly.

In some implementations, one or more of the following advantages may be realized.

Light sources and optical detectors can reside on the same side of a bill path in a document acceptor that utilizes optical transmission detection. Such an arrangement can simplify construction and minimize hardware required in the document acceptor. Additionally, placing the light sources and optical detectors on the same side of the bill path can simplify the maintenance, testing and repair of document acceptors. This is particularly true if the light sources and optical detectors are on the same circuit board.

Moreover, the profile of light intensity/brightness across a light emitting surface may be controlled and customized, for example, to accommodate for losses in light intensity/brightness that might otherwise occur across a light pipe assembly.

Additionally, the number of optical detectors required to detect a document in a document path may be reduced.

Fresnel lenses are relatively easy to fabricate, particularly as compared to functionally comparable conventional lenses. Accordingly, fresnel lenses are also relatively inexpensive.

Other features and advantages of the invention will be apparent from the description and drawings, and from the claims.

BRIEF DESCRIPTION OF THE DRAWINGS

FIG. 4 is a perspective view of a light pipe core.
FIG. 5 is an enlarged view of part of the light pipe core in FIG. 4.

DETAILED DESCRIPTION

Figure 1:
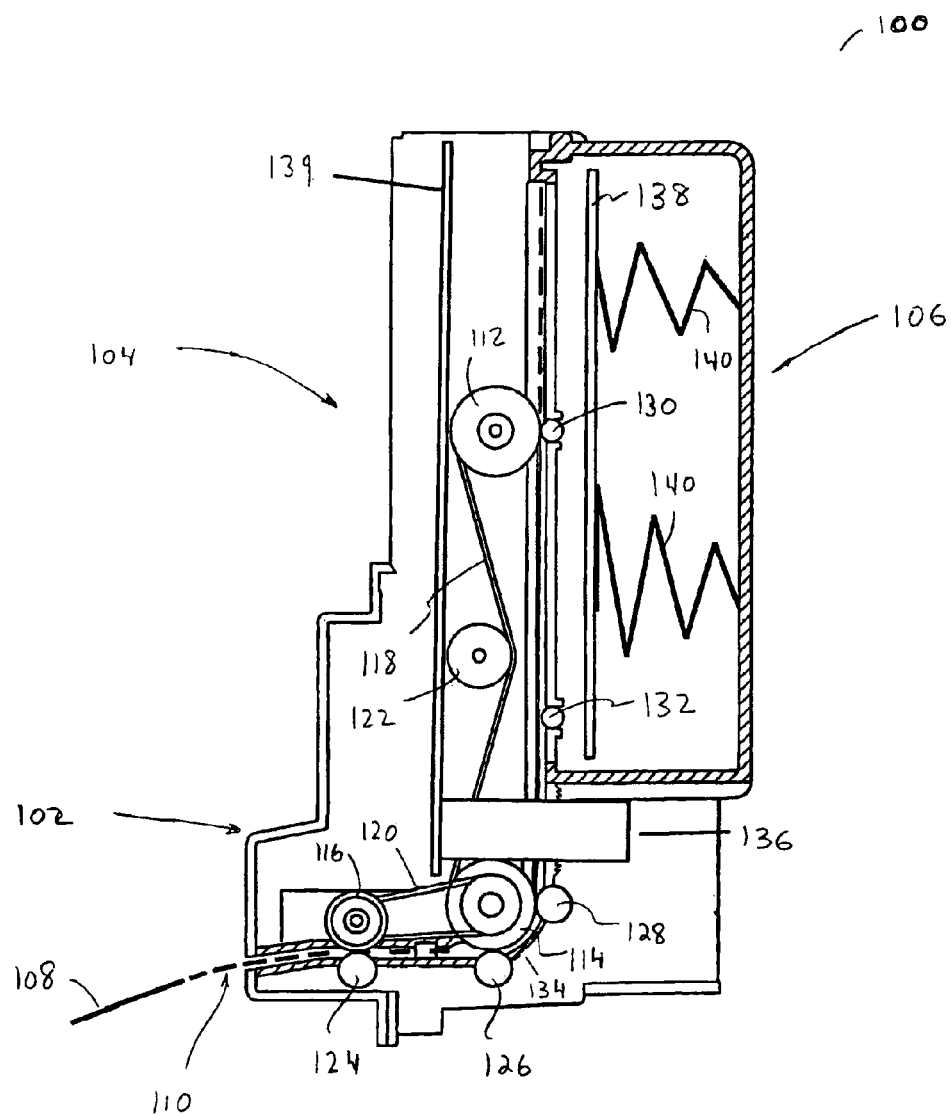
FIG. 1 is a partial cutaway view of a document acceptor.

FIG. 1 is a cutaway view of an example of a document acceptor 100 (e.g., a bill validator) with certain components removed. The term "document" as used herein includes any paper currency, banknote, bar-coded coupon or other security note which may be used in exchange for goods or services. The illustrated document acceptor 100 includes a validation portion 102, a transport and stacking portion 104 and a magazine portion 106. The path of a document 108 through the document acceptor 100 is indicated by dotted line 110. The document path 110 includes the spaces that a document might actually pass through while moving through the document acceptor 100.

The illustrated transport system includes a pair of drive rollers 112, a first pair of driven rollers 114 and a second pair of driven rollers 116 provided on one side of the document path 110. The first pair of driven rollers 114 is coupled to the pair of drive rollers 112 by a pair of belts 118. The second pair of driven rollers 116 is coupled to the first pair of driven rollers 114 by a pair of belts 120. The rollers 112, 114 and 116 include teeth to engage corresponding teeth on the belts 118, 120. Rollers 122 preferably bear against belts 118 to maintain tension on the belts 118 during operation. Only one of each pair of rollers and belts is shown in FIG. 1.

On the opposite side of the document path 110, pairs of spring loaded rollers 124, 126 and 128 press against the first pair of driven rollers 114 and the second pair of driven rollers 116. A motor (not shown) is coupled to the pair of drive rollers 112 through coupling gears (not shown). A control and processing circuit, which includes a microprocessor (not shown) controls operations of the acceptor unit.

A document sensor assembly 136 is shown schematically intersecting the document path 110. The document sensor assembly 136 typically includes one or more light sources (e.g., light emitting diodes) and optical detectors, all of which may be mounted to the printed circuit board 139. The optical detector assembly 136 also typically includes a light pipe assembly on an opposite side of the document path 110 from the light sources and optical detectors. In some implementations, the light pipe assembly may be adapted to receive light from the light sources and direct that light across the bill path 110 to the optical detectors. In some implementations, the printed circuit board 139 includes other circuitry related to optical detector assembly operations.

During operation, a document 108 that is inserted into the validation portion 102 of the document acceptor 100 is engaged by the second pair of driven rollers 116 and passive rollers 124. The document is advanced to the first pair of driven rollers 114 and passive rollers 126 and then 128, up a curved portion 134 and to the optical detector assembly 136. After passing through the document sensor assembly 136, the document is conveyed up to the pair of drive rollers 112 and passive rollers 130, which advance it to the end of the document path 110 into position for stacking in the magazine portion 106. A pressure plate 138 and conical springs 140 are provided in the magazine portion 106 of the document acceptor 100.

In some implementations, the optical detector assembly 136 may operate in different modes including, for example, a validation mode, an escrow mode, a pattern sensing or barcode sensing mode, or an anti-cheat mode.

Figure 2:
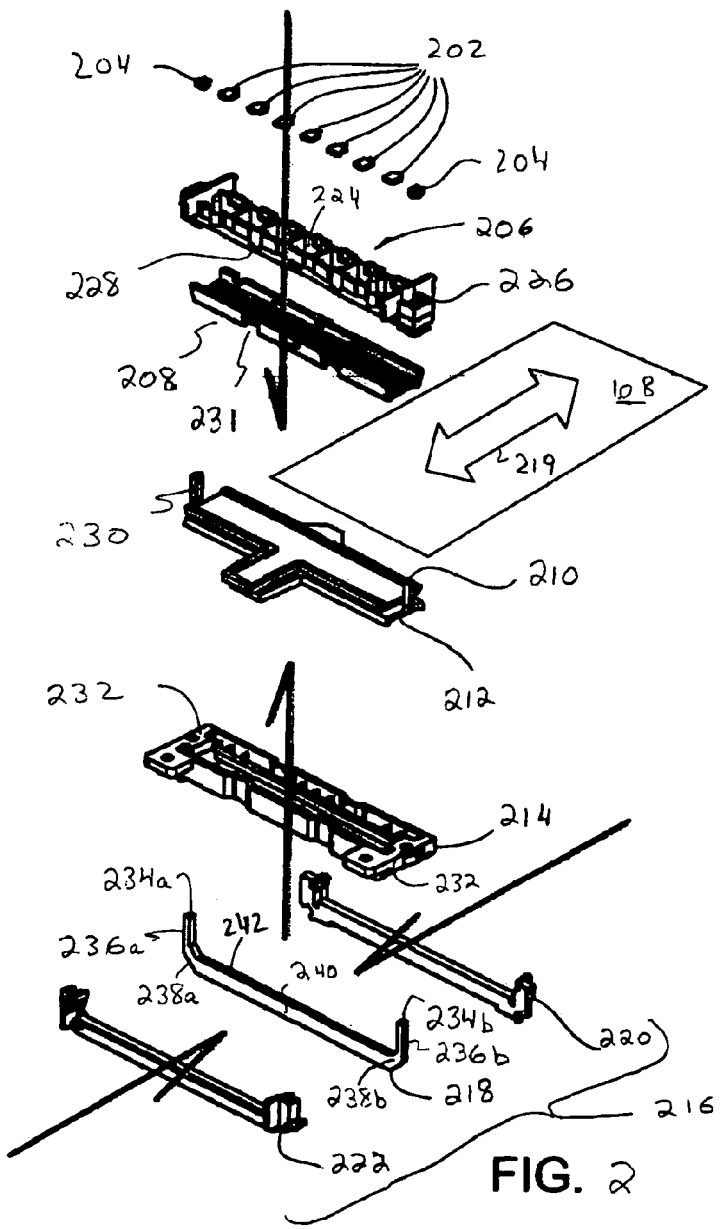
FIG. 2 is an exploded perspective view of an optical detector assembly.
Figure 3:
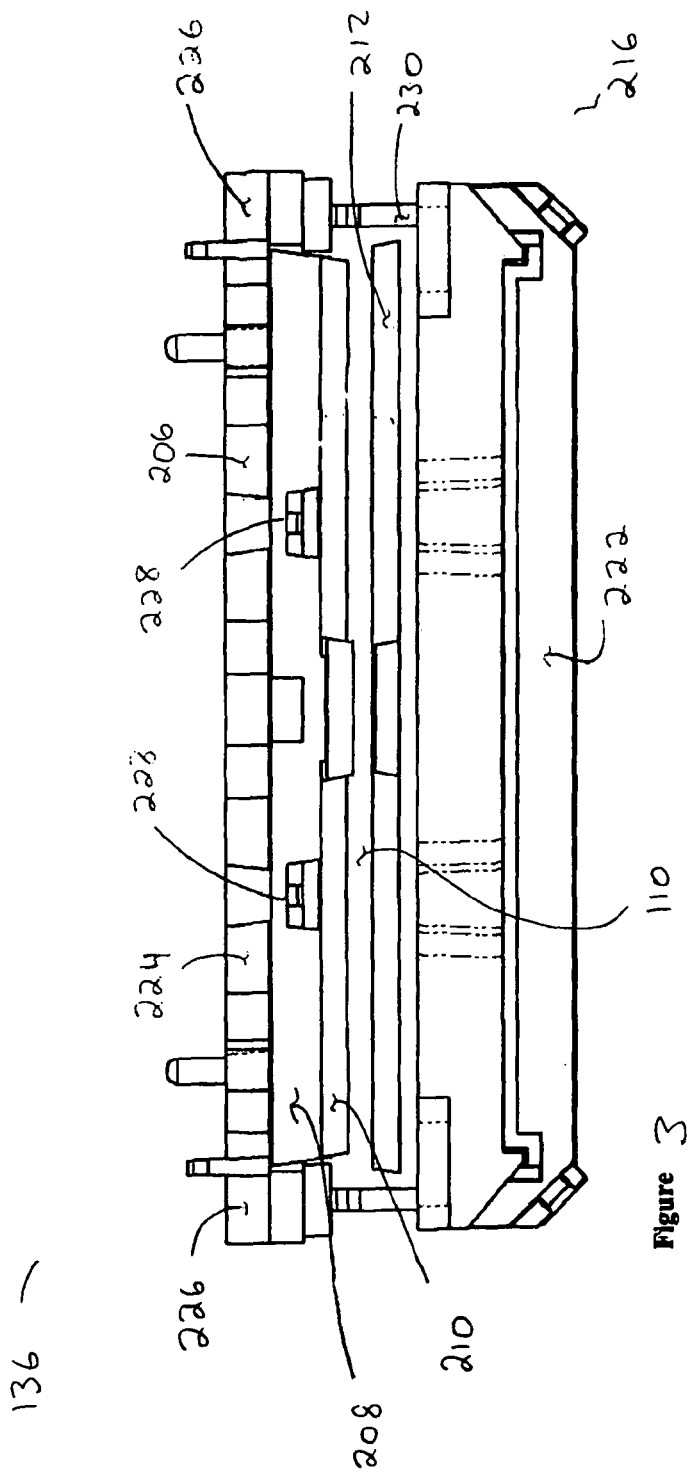
FIG. 3 is a front view of an assembled optical detector assembly.

FIGS. 2 and 3 show an exploded perspective view (FIG. 2) and an assembled front view (FIG. 3) of the document sensor assembly 136 of FIG. 1.

The illustrated assembly 136 includes an array of optical detectors 202, a pair of light sources 204, an upper housing element 206, a fresnel lens array 208, an upper document path window 210, a lower document path window 212 with a fresnel structure on its bottom side, a lower housing element 214, and a light pipe assembly 216 that includes a light pipe core 218, a first housing shell 220 and a second housing shell 222. A document 108 is shown next to the upper and lower document path windows 210, 212 with a bidirectional arrow 219 indicating the directions that the document can move along the portion of the document path (i.e., 110 in FIG. 1) between the upper and lower document path windows 210, 212.

The optical detectors 202 and light sources 204 are located on a first side of the document path 110. In some implementations, the optical detectors 202 and light sources 204 are mounted on the same circuit board (e.g., circuit board 139 in FIG. 1). The optical detectors 202 and light sources 204 may be coupled to other circuitry (not shown) for control and signal processing.

The optical detectors 202 can be photoresistors, photovoltaic cells, photodiodes, phototransistors or other devices that are responsive to light. In some implementations, the optical detectors are BPW34 PIN diodes that have substantially square active areas and flat plastic packages with no lenses. In those implementations, the optical detectors 202 allow incident light to enter the active areas thereof.

As illustrated, the optical detectors 202 are oriented in such a manner that light can enter the active areas of the optical detectors from below. More specifically, the optical sensors 202 are facing downward (i.e., toward the portion of the document path 110 that extends between the upper and lower document path windows 210, 212). That arrangement enables light traveling up from the document path to enter the active areas of the optical detectors 202. The optical detectors 202 are arranged in a substantially straight row that is approximately perpendicular to the document's direction of travel 219. In a typical implementation, all of the optical detectors 202 are mounted on the same circuit board (e.g., circuit board 139 in FIG. 1), which is positioned very close to the upper housing element 206. In some implementations, the upper housing element 206 is mounted directly to the optical detector's circuit board.

The light sources 204 are positioned at opposite ends of the row of optical detectors 202 and are substantially aligned with those optical detectors 202. The illustrated light sources 204 are light emitting diodes, however, other types of light sources may be suitable as well. In some implementations, more than one light source may be positioned at each end of the row of optical detectors 202. Also, some implementations include only one light source. The light sources 204 can be adapted to operate at different wavelengths. In some implementations, the light sources 204 are top-LED packages available from OSRAM Gmbh.

In assembly, the light sources 204 are arranged to transmit light from the first side of the document path, around the document path, to a second, opposite side of the document path where the light pipe assembly 216 is located. In some implementations, a small portion of the light that is transmitted to the second, opposite side of the document path may pass through a document in the document path. However, it is preferable that the light that is transmitted from the first to the second, opposite side of the document path not pass through a document in the document path. Instead, that light preferably travels around the document path without passing through the document.

The light pipe assembly 216 receives the light that is transmitted by the light sources 204 and redirects that light from the second side of the document path to the optical detectors 202 on the first side of the document path. The light transmitted by the light pipe assembly typically crosses the document path (i.e., it passes through a document in the document path). Accordingly, in the illustrated implementation, at least a substantial portion of the light that returns to the optical detectors 202 has passed through a document in the document path once and only once.

The upper housing element 206 is positioned below the light sensors 202 and lights sources 204. The upper housing element 206 extends in a substantially perpendicular direction relative to the document's 108 direction 219 of travel along the document path 110.

The upper housing element 206 has a number of discrete compartments, including seven optical detector compartments 224 and two light source compartments 226. Each optical detector 202 is positioned above or within an associated one of the optical detector compartments 224. Each light source 204 is positioned above or within an associated one of the light source components 226. The optical detector and light source compartments 224, 226 form a substantially straight row of compartments.

The bottom of each compartment 224, 226 allows the flow of light either into or out of the compartment. In some implementations, the bottom of each compartment is formed from a translucent and/or transparent material. In other implementations, the bottom of each compartment is simply open. Vertical baffles separate adjacent compartments from one another. The vertical baffles are substantially opaque and, therefore, function to at least partially optically isolate adjacent compartments from one another.

A number of engagement features 228 are formed in the upper housing element 206. The engagement features 228 mate with corresponding engagement features 231 on the fresnel lens array 208. Engagement of corresponding engagement features 228, 231 holds the upper housing element 228 and the fresnel lens array 208 together.

The fresnel lens array 208 is positioned between the upper housing element 206 and the upper document path window 210. The fresnel lens array 208 has a substantially continuous fresnel structure on its upper surface and a segmented fresnel structure on its lower surface. The segmented fresnel structure is substantially orthogonal to the fresnel structure on the upper surface of the fresnel lens array 208.

The fresnel lens array is adapted to anamorphically distort light traveling from the light pipe assembly 216 to the optical detectors 202. The anamorphic distortion facilitates focusing light from a relatively wide area of the document path onto each optical detector. In some implementations, that relatively wide area is approximately oblong-shaped. Since each optical detector 202 receives light that corresponds to a relatively wide area of the document path, fewer optical detectors 202 may be required to cover a document path having a particular width.

The fresnel lens array 208 is wide enough so that substantially all of the light from the light pipe assembly 218 that reaches the optical detectors 202 passes first through the fresnel lens array. The fresnel lens array 208, however, is narrow enough that the light transmitted by the light sources 204 to the light pipe assembly does not pass through the fresnel lens array 208. Instead, that light goes around the edges of the fresnel lens array 208. The fresnel lens array 208 extends in a substantially perpendicular direction relative to the document's 108 travel direction 219 along the document path 110 and covers substantially the entire width of the document path 110.

The upper document path window 210 is below the fresnel lens array 208. The lower document path window 212 is below the upper document path window 210. The upper and lower document path windows 210, 212 extend in a substantially perpendicular direction relative to the document's 108 travel direction 219. Substantially flat surfaces on the upper and lower document path windows 210, 212 define a portion of the document path 110 therebetween. Portions of the upper and lower document path windows 210, 212 are translucent and, therefore, allow light to enter the document path 110 through the lower document path window 212 and to exit the document path 110 through the upper document path window 210. The upper document path window 210 has approximately the same width as the fresnel lens array 208.

The lower document path window 212 is wider than the upper document path 210. The lower document path window has an infinite-conjugate cylindrical fresnel lens on its lower surface. That lens is adapted to pseudo-collimate (i.e., at least partially collimate) light passing through. In some instances, the term "pseudo-collimate" refers to collimation in only one axis (as in using a cylindrical lens).

A pair of straight light pipes 230 extend up from the lower document path window 212 at opposite ends thereof. Each tube is adapted to carry light from the light source 204 to the light pipe assembly 216. Accordingly, each straight light pipe 230 has a substantially translucent entrance at its upper end and a substantially translucent exit at its lower end. In some implementations, the tubes 230 have substantially reflective internal surfaces to facilitate light transmission. When the optical detector assembly is assembled, the tubes 230 may extend into respective light source compartments 226 of the upper housing element 206 and are generally positioned to receive light from the respective light sources 204. In some implementations, the straight light pipes are formed from a transparent acrylic material.

The lower housing element 214 is located below the lower document path window 212. The lower housing element 214 extends in a substantially perpendicular direction relative to the document's 108 travel direction 219. Interior surfaces of the lower housing element 214 define an opening through which light can travel from the light pipe assembly 216 to the lower document path window 212. In some implementations, the opening is simply an opening that extends from the bottom to the top of the lower housing element 214. In some implementations, the opening may include a substantially translucent or transparent material as well.

The lower housing element 214 has holes 232 that extend through it at opposite ends thereof. When the optical detector assembly is assembled, those holes 232 receive portions of the light pipe assembly 216. Light travels from the straight light pipes 230 on the lower document path window 212 into the holes 232 to the light pipe assembly 216.

The light pipe assembly 216 is substantially u-shaped and includes a light pipe core 218, a first housing shell 220 and a second housing shell 222.

The light pipe core 218 may be fabricated from a translucent material, such as glass or clear plastic. The light pipe core 218 defines a first light input port 234a at a first end of the light pipe assembly 216 and a second input light port 234b at a second end of the light pipe assembly 216. A light emitting surface 242 extends substantially between the first and second ends of the light pipe assembly 216. In the illustrated implementation, the light emitting surface 242 is arranged to transmit light across the document path to the optical detectors 202.

Surface features (not visible in FIG. 2) are formed in the light emitting surface 242. In some implementations, the surface features are pyramid-shaped. Typically, the surface features help ensure that the light emitted from the light emitting surface is substantially uniform in brightness/intensity across the width of the light emitting surface. In some implementations, such uniformity may be achieved regardless of whether light enters the light pipe assembly 218 at the first light input port 234a or the second light input port 234b.

In the illustrated implementation, the first 234a and second 234b light input ports and the light emitting surface 242 are arranged in such a manner that light enters the first or second input ports from a first direction (i.e., in a substantially downward direction) and exits the light emitting surface 242 in a second direction, opposite the first (i.e., in a substantially upward direction).

The light pipe core 218 includes the light entrance ports 234a, 234b, vertical stems 236a, 236b that respectively extend downward from each entrance port 234a, 234b, angled connectors 238a, 238b that respectively extend from each vertical stem 236a, 236b and a horizontal base portion 240 that extends between the angled connectors 238a, 238b. An upper surface of the base portion 240 is the light emitting surface 242.

The first and second shell housings 220, 222 are adapted to engage one another to form a protective barrier around most of the light pipe core 218. In some implementations, the first and second shell housings 220, 222 are molded plastic pieces and are generally opaque. The first and second housing shells may be white. In some implementations, the first and second shell housings are made, for example, with low-cost acrylonitrile butadiene styrene (ABS) material and encapsulate the core. The inner surfaces of the first and second shell housings 220, 222 that, in assembly, contact or face the light pipe core 218 preferably are diffusely reflective (i.e., they allow reflection to occur from an uneven or granular surface so that incident light rays are seemingly reflected at a number of angles).

When coupled together, the first and second shell housings 220, 222 form an opening above the upper surface of the light pipe core 218. That opening allows light from the light emitting surface 242 to travel in an upward direction toward the document path. When assembled, the ends (including at least the first and second light entrance ports 234a, 234b) are exposed through the first and second shell housings 220, 222 as well. That arrangement allows light from the light source 204 to enter the light pipe core 218 via the exposed light entrance ports 234a, 234b.

An example of the optical sensor assembly's operation follows. One of the light sources 204 is illuminated. Light from the light sources 204 travels downward into one of the straight light pipes 230. The light travels through the straight light pipe 230, passing around the document path. Light from the straight light pipe 230 then enters the light pipe assembly 216 through one of the light input ports (e.g., through light input port 234a). Light propagates through the light pipe core 218 either by total internal reflection (TIR) and/or by reflecting off various parts of the light pipe core 218 and/or the diffusely reflective shell housing 220, 222 surfaces.

Total internal reflection refers to an optical phenomenon that occurs when a ray of light strikes a medium boundary at an angle larger than a critical angle with respect to the normal to the boundary. In that situation, if the refractive index is lower on the other side of the boundary, then no light passes through the boundary and the light is totally internally reflected. The critical angle is the angle of incidence, above which total internal reflection occurs.

Light exits the light pipe core 218 through the light emitting surface 242. Light then travels upward through the opening formed by the first and second housing shells 220, 222. Light then travels through the fresnel lens on the lower document path window 212 and into the document path. In some implementations, the fresnel lens on the lower document path window 212 has a focal length of approximately 12 mm and a fresnel pitch of about 0.75 mm. Preferably, the fresnel structure is located on the underside of the lower document path window 212, the other side of the window forming one side of the document path and being substantially flat. This may be considered desirable to avoid protrusive features in the document path that could cause jams. The side of the upper document path window 210 that faces the substantially flat side of the lower document path window 212 also is substantially flat.

If a document is present in the document path, at least some of the light passing through the document path passes through the document itself. Light exits the document path through the upper document path window 210. Light then passes through the fresnel lens array and into discrete optical detector compartments 224 in the upper housing element. Light then reaches the optical detectors 202, which generate signals for further processing.

FIG. 4 is a perspective view of the light pipe core 218 of FIG. 2. FIG. 5 is an enlarged view of area "A" in FIG. 4.

In the illustrated implementation, a row of surface features 402 are formed on the light emitting surface 242. The illustrated surface features 402 are substantially pyramid-shaped and approximately evenly spaced along the light emitting surface 242. Each surface feature 404 has a substantially rectangular base and four approximately equally-sized triangular sides, which meet at a point some distance above the base. Each substantially rectangular base is formed so that two of its sides are approximately parallel to the base portion's 240 longitudinal axis. In the illustrated implementation, the smallest of the surface features occupy approximately 40% of the surface area of a unit area on the light emitting surface 242. The larger surface features 402 occupy a larger percentage of each unit of area of the upper surface.

In general, the amount of light exiting each portion of the light emitting surface 242 is related to the size of the surface features 402 in that portion. In portions that have larger surface features 402, the amount of light exiting those portions is generally greater than would otherwise be exiting those portions if those portions had smaller surface features or no surface features at all. By varying the size of the surface features 404 across the light emitting surface 242, the profile of light intensity/brightness exiting the light emitting surface 242 can be customized.

In the illustrated implementation, the surface features 402 vary in size across the light emitting surface 242. More particularly, the smallest of the surface features 402 are at opposite ends of the light emitting surface 242. The sizes of the surface features 402 gradually increase moving toward the center of the light emitting surface 242. The varying sizes of the pyramid-shaped features 404 can be more easily seen in FIG. 5.

Since the smallest surface features 402 are located at opposite ends of the light emitting surface 242 and the surface features 402 gradually increase in size moving toward the center of the light emitting surface 242, the greatest amount of light enhancement occurs near the center of the light emitting surface 242. Such an arrangement may be helpful to counteract a drop in light intensity/brightness that otherwise might occur near the center of the light emitting surface 242 as compared to the ends of the light emitting surface 242. Indeed, with the illustrated arrangement of surface features, the effect on the light intensity/brightness profile is similar regardless of whether light enters the light pipe core 218 through light input port 234a or light input port 234b.

In general, light intensity/brightness generally drops across a light emitting surface moving away from the place where light enters the light pipe assembly. Such a drop in intensity is generally caused by inefficiencies. Accordingly, if light were to enter, for example, input port 234a of light pipe assembly 216, and if the upper surface 402 of the core's 218 base portion 240 were completely flat, light intensity/brightness across the light emitting surface 242 might drop moving away from input port 234a. If the upper surface has surface features 402, however, that increase in size moving away from input port 234a (as shown in FIGS. 4 and 5), the drop in intensity may be reduced.

Figure 6:
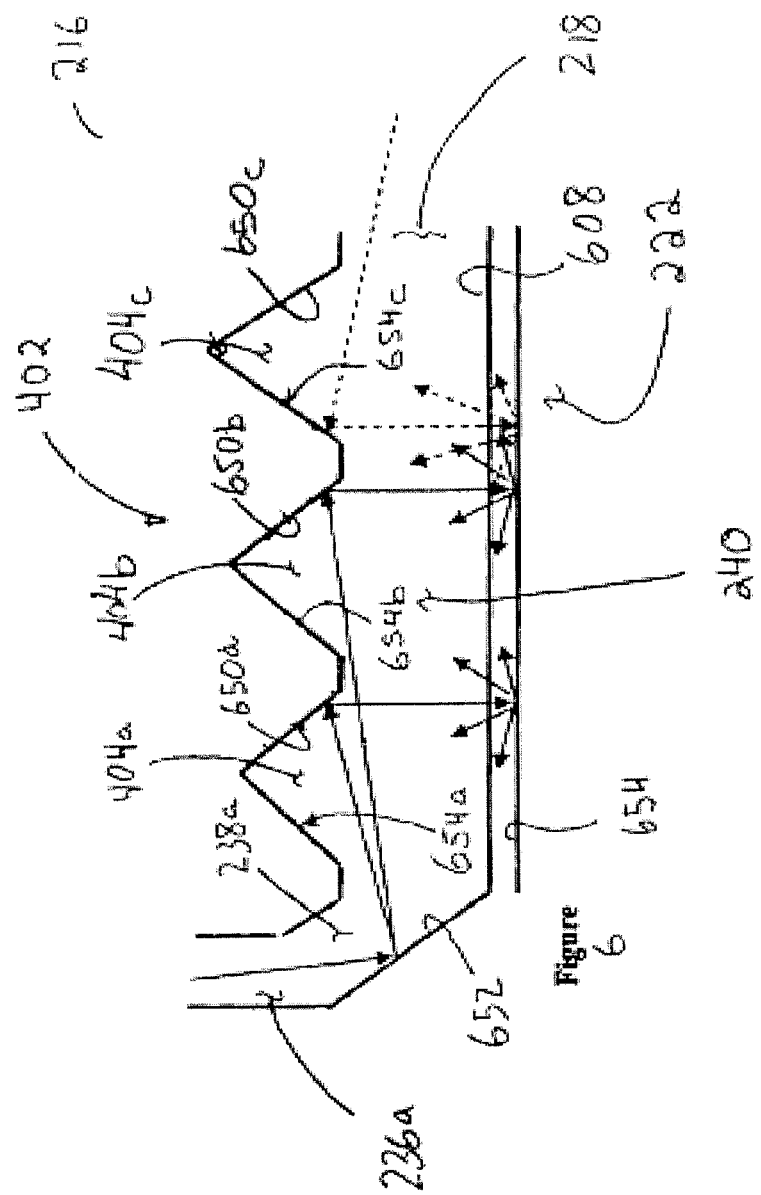
FIG. 6 is a cross-sectional view of part of a light pipe assembly, with directional arrows showing light flow through the portion.

FIG. 6 is a cross-sectional schematic view of part of a light pipe assembly 216. The illustrated implementation shows part of the light pipe core 218 and part of the second housing shell 222. Arrows show light propagating through the light pipe assembly 216.

The illustrated portion of the light pipe core 218 includes part of a vertical stem 236a, an angled connector 238a and part of the base portion 240. Although not visible in FIG. 6, the vertical stem 236a is connected to a first light input port (i.e., 234a in FIG. 4) at a first end of the light pipe assembly 216. The upper surface of the base portion 240 is a light emitting surface 402.

Surface features 404a, 404b, 404c are formed in the light emitting surface 402. The illustrated surface features 404a, 404b, 404c are substantially pyramid-shaped and increase in size from surface feature 404a to surface feature 404c. Each surface feature 404a, 404b, 404c defines a first internally reflective boundary 650a, 650b, 650c at a far end of the surface feature relative to the first light input port (i.e., 234a in FIG. 4). Light that enters the first light input port is directed to the first internally reflective boundaries 650a-650c by angled reflector 652. Preferably, angled reflector 652 is sufficiently angled relative to the vertical stem 236a to ensure total (or nearly total) internal reflection of light from the first light input port.

Light reflected off the first internally reflective boundaries 650a-650c is directed substantially downward and passes through a bottom boundary 608 of the light pipe core 218. Preferably, the first internally reflective boundaries 650a-650c are sufficiently angled relative to the direction of light coming from the angled reflector 652 to ensure total (or nearly total) internal reflection. Preferably too, the surface features 404a-404c are arranged so that light from the angled reflector 652 that passes through the first internally reflective boundaries, if any, reenters an adjacent one of the surface features 404a-404c.

Light that passes through the bottom boundary 608 is diffusely reflected off the diffusely reflective surface 654 at the inner surface of the second housing shell 222. Typically, a substantial portion of the diffusely reflected light travels up to exit the light pipe core 218 through the light emitting surface 402. Such light typically exits the light pipe core 218 at a longitudinal position along the light pipe core 218 that is near an associated one of the surface features 404a, 404b, 404c.

Since the surface features 404a, 404b, 404c increase in size across the light emitting surface 402, so too do the sizes of the corresponding first internally reflective boundaries 650a, 650b, 650c. Accordingly, the first internally reflective boundaries 650a, 650b, 650c gradually increase in size from first internally reflective boundary 650a to first internally reflective boundary 650c. The larger first internally reflective boundaries generally enhance the light intensity/brightness more than the smaller first internally reflective boundaries.

The illustrated light pipe assembly 216 has a second light input port (i.e., 234b in FIG. 4) at the second end of the light pipe assembly. Each surface feature 404a, 404b, 404c in the light emitting surface 402 defines a second internally reflective boundary 654a, 654b, 654c at a far end of the surface feature 404a, 404b, 404c relative to the second light input port (i.e., 234b in FIG. 4). Light that enters the second light input port (an example of which is shown as a dotted arrow in FIG. 6) is directed to the second internally reflective boundaries 654a, 654b, 654c by an angled reflector (not shown). The diffusely reflective surface 654 of the second housing shell 222 reflects light from the second internally reflective boundaries 654a, 654b, 654c through the light emitting surface 402.

The second internally reflective boundaries 654a, 654b, 654c vary in size across the light emitting surface 402. In the illustrated portion of the light pipe assembly 216, the second internally reflective boundaries 654a, 654b, 654c increase in size from surface feature 404a to surface feature 404c.

As discussed below in further detail, in some implementations, the second internally reflective boundaries 654a, 654b, 654c may increase in size in one direction across the light emitting surface while the first internally reflective boundaries 650a, 650b, 650c increase in size in a second, opposite direction across the light emitting surface.

Figure 7:
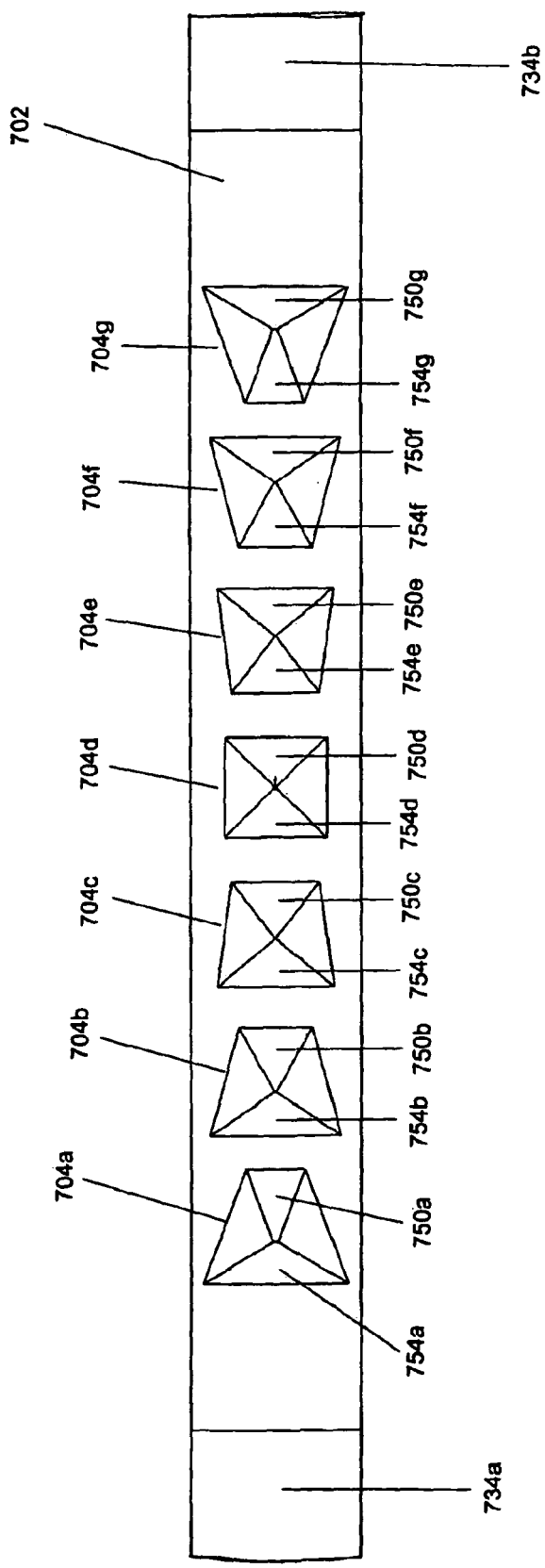
FIG. 7 is a plan view of portions of a light pipe assembly.

FIG. 7 is a plan view of portions of a light pipe assembly 716. The illustrated light pipe assembly 716 has a light emitting surface 702 with an alternative arrangement of surface features 704a to 704g thereon.

Except for the centermost surface feature 704d, all of the surface features 704a-704c and 704e-704g, have substantially trapezoidal bases. The centermost surface feature 704c has a substantially rectangular base. Each substantially trapezoidal base has a pair of substantially parallel sides, one of which is longer than the other.

A first light input port 734a is at a first end of the light emitting surface 702. A second light input port 734b is at a second, opposite end of the light emitting surface 702. Each surface feature 704a-704g defines a first internally reflective boundary 750a-750g at a far end of the surface feature relative to the first light input port 734a. Light that enters the first light input port 734a is directed to the first internally reflective boundaries 750a-750g. One or more reflective surfaces (not shown in FIG. 7) are arranged to receive light reflected by the first internally reflective boundaries 750a-750g and diffusely reflect that light through the light emitting surface 702.

As shown, the first internally reflective boundaries 750a-750g vary in size across the light emitting surface 702. More particularly, the first internally reflective boundaries 750a-750g gradually increase in size from the first light input port 734a to the second light input port 7343b.

Each surface feature 704a-704g also defines a second internally reflective boundary 754a-754g at a far end of the surface feature 704a-704g relative to the second light input port 734b. Light that enters the second light input port 734b is directed to the second internally reflective boundaries 754a-754g. One or more reflective surfaces (not shown in FIG. 7) receive light reflected by the second internally reflective boundaries 754a-754g and reflect that light through the light emitting surface 702.

As shown, the second internally reflective boundaries 754a-754g vary in size across the light emitting surface 702. More particularly, the second internally reflective boundaries 754a-754g gradually increase in size from the second light input port 734b to the first light input port 734a.

Since the first internally reflective boundaries 750a-750g and the second internally reflective boundaries 754a-754g gradually increase in size in opposite directions, the profile of light intensity/brightness can be regulated across the light emitting surface 702 regardless of whether light is entering the light pipe assembly 716 through the first 734a or second 734b light input port.

Figure 8:
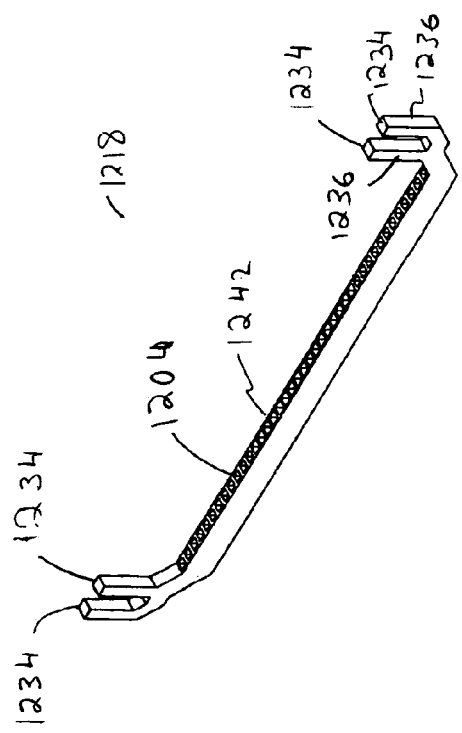
FIG. 8 is a perspective view of an alternative light pipe core.

FIG. 8 is a perspective view of an alternative light pipe core 1218.

The illustrated light pipe core includes two substantially parallel input ports 1234 at each end of the core 1218. The illustrated light pipe core 1218 is adapted to carry light via total (or substantially total) internal reflection from any of the input ports 1234 to the light emitting surface 1242. The light emitting surface 1242 includes a row of surface features 1204 formed thereon. The surface features 1204 gradually increase in size from each end of the light emitting surface 1242 toward the center of the light emitting surface 1242. During operation, light may enter the light pipe core 1218 through one or more of the four light input ports 1234.

The illustrated dual port geometry can allow more than two multi-die light emitting diode packages to be used for illumination in cases where, for example, additional optical energy or additional wavelengths are desired. In some implementations, the light pipe core may include three or more input ports at each end of the light pipe core.

Figure 9:
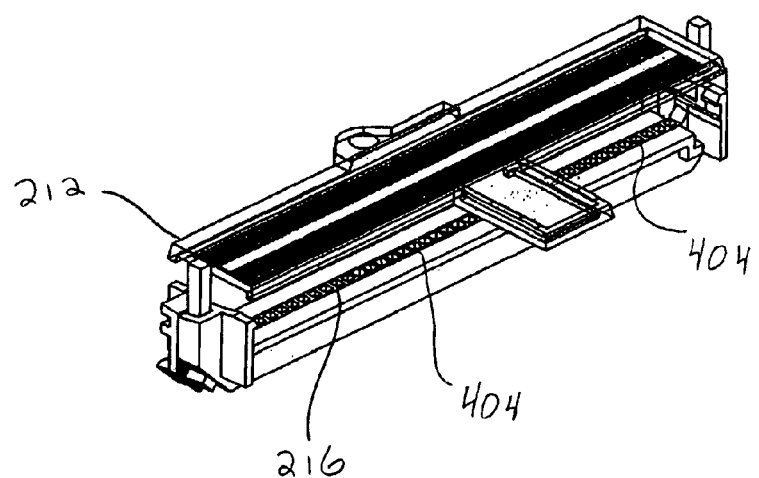
FIG. 9 is a partial perspective view showing the relative positions of the light pipe assembly and the lower document path window.

FIG. 9 is a partial perspective view showing the relative positions of the light pipe assembly 216 and the lower document path window 212.

The light emitting surface 402 of the light pipe assembly 216 has a row of pyramid-shaped surface features 404 thereon. The lower document path window 212 is directly above the light emitting surface 402. A fresnel structure (not visible) is on a side of the lower document path window 212 facing the light pipe assembly 216. The upper surface of the lower document path window 212 is substantially flat and forms part of the document path.

Light emitted from the light emitting surface 402 passes through the fresnel structure on the lower document path window. The fresnel structure at least partially collimates the light passing through it.

Figure 10:
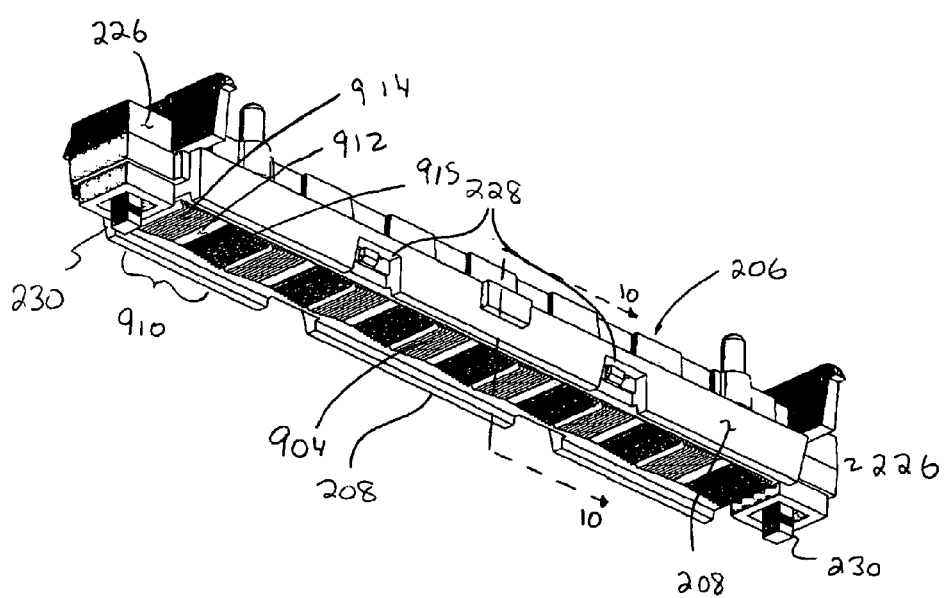
FIG. 10 is a perspective view of a fresnel lens array and an upper housing element.
Figure 11:
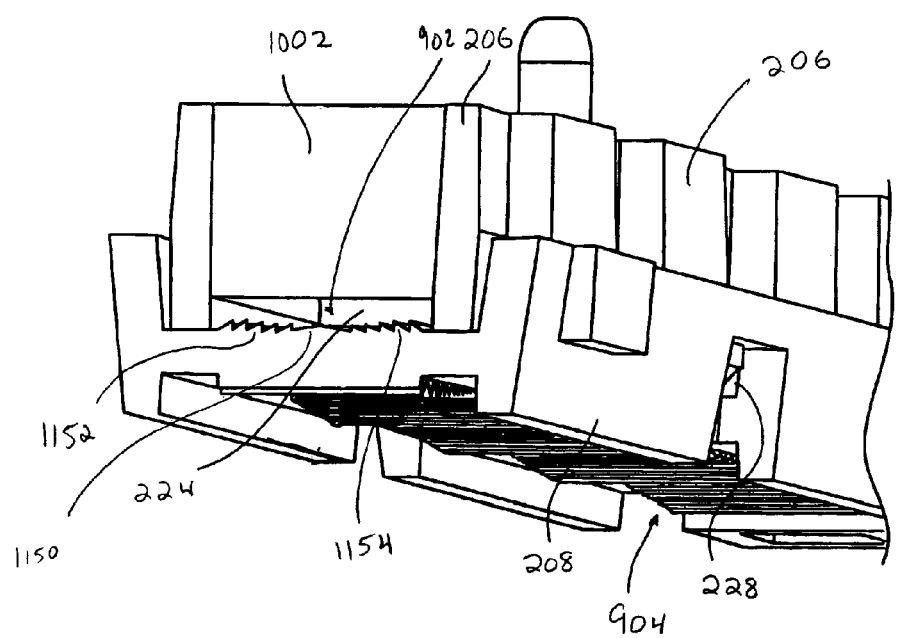
FIG. 11 is a cutaway view taken along lines 11-11 in FIG. 10.
Figure 12B:
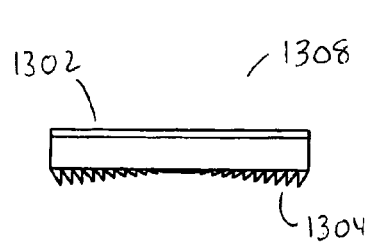
FIG. 12B is a side view of the fresnel lens of FIG. 11A.
Figure 12A:
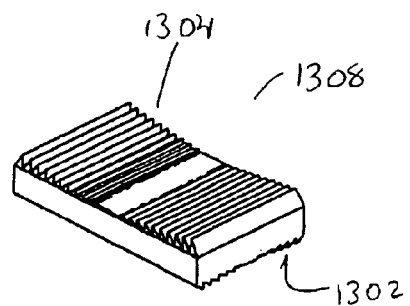
FIG. 12A is a perspective view of a single lens from a fresnel lens array.
Figure 12C:
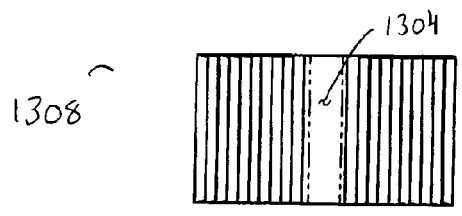
FIG. 12C is a top view of the fresnel lens of FIG. 11A.
Figure 12D:
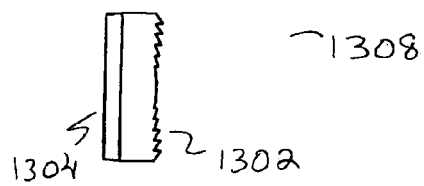
FIG. 12D is an end view of the fresnel lens of FIG. 11A.

FIG. 10 is a perspective view of a fresnel lens array 208 and an upper housing element 206. FIG. 11 is a cutaway view taken along lines 11-11 in FIG. 10.

The illustrated array 208 includes a first fresnel structure 902 on a first side thereof and a second fresnel structure 904 on a second, opposite side of thereof. The first fresnel structure 902 extends continuously across substantially an entire length of the array 208. The second fresnel structure 904 has several fresnel segments 910. Each fresnel segment 910 is substantially orthogonal to the first fresnel structure 902. Each fresnel segment 910 corresponds to and is substantially aligned with one of the optical detectors 202.

During operation, light passes through the array 208 of fresnel lenses to the plurality of optical detectors. The array 208 of fresnel lenses anamorphically distorts the light. More specifically, the array 208 of fresnel lenses anamorphically compress the light. Accordingly, each optical detector 202 receives light that corresponds to an approximately oblong-shaped area of the bill path. In some implementations, the oblong-shaped area has a width of approximately 12 mm in a direction across the width of the document path (i.e., in a direction that is perpendicular to the document's direction of travel through the path). In some implementations, the length of oblong-shaped area (i.e., in a direction perpendicular to the width) is approximately 7 mm.

Since the optical detectors 202 receive light that corresponds to an approximately oblong area of the document path, fewer optical detectors 202 may be required to cover a particular area of the document path.

The first fresnel structure 902 includes a convex central region 1150. A first set 1152 of teeth extends across the array on a first side of the convex central region 1150. A second set 1154 of teeth extends across the array on a second side of the convex central region 1150. Each tooth includes a first surface that extends from the array in an approximately normal direction relative to a plane of the array and a second surface that extends from a distal end of the first surface and is angled relative to the plane of the array. The angle of adjacent second surfaces of at least some of the teeth differ from one another. More particularly, the angle of second surfaces in adjacent teeth of each set increases moving away from the convex central region.

Similarly, each fresnel segment 910 of the second fresnel structure 904 includes a convex central region 912. A first set 914 of teeth extends across each segment 910 on a first side of the convex central region 912. A second set 915 of teeth extends across the array 208 on a second side of the convex central region 912. Each tooth includes a first surface that extends from the array in an approximately normal direction relative to a plane of the array and a second surface that extends from a distal end of the first surface and is angled relative to the plane of the array. The angle of adjacent second surfaces of at least some of the teeth differ from one another. More particularly, the angle of second surfaces in adjacent teeth of each set increases moving away from the convex central region.

The first 902 and second 904 fresnel structures are substantially orthogonal to one another. The illustrated fresnel lens array 208 is an infinite conjugate cylindrical fresnel lens and is adapted to provide anamorphic imaging of light exiting the upper surface 402 of the light pipe core 218. In general, a lens (or lens array) that provides anamorphic imaging produces different magnification along lines in different directions in the image plane. In the illustrated implementation, anamorphic imaging enables fewer optical detectors 202 to cover a larger distance across the document path than would otherwise be possible. Accordingly, fewer optical detectors 202 are required than would be in the absence of anamorphic imaging capabilities.

In a typical implementation, the number of discrete fresnel segments 910 on the lower fresnel surface 904 is equal to the number of optical detectors 202 in the optical detector assembly, and each fresnel segment 910 is associated with a respective one of the optical detectors 202. Accordingly, in the illustrated implementation, the lower fresnel surface 912 has seven discrete fresnel segments 910, each of which corresponds to an associated one of the optical detectors 202.

The fresnel lens array 208 can be made of plastic. However, other materials may be suitable as well. The fresnel lens array 208 may be molded so that it forms part of the document path 110. However, as there are fresnel features on both sides of the fresnel lens array 208, it often will be desirable that the fresnel lens array 208 not form part of the document path 110, as doing so may subject the document path 110 to jamming and collection of dust. It is generally desirable, therefore, to mold the fresnel lens array as a stand-alone piece and to have a separate element (e.g., upper document path window 210) serve as part of the document path.

The upper housing element 206 is above the fresnel lens array 208. The upper housing element 206 includes vertical baffles 1002 that separate adjacent optical detector compartments 224 from one another. The vertical baffles 1002 are substantially opaque and, therefore, function to at least partially optically isolate adjacent compartments from one another.

Focal length of the fresnel lens array 208 generally determines optical throughput of each fresnel section. In some implementations, it is desirable that each fresnel section provide anamorphic imaging of an approximately 7×12 mm area of the document path 110. In those implementations, a focal length of about 7 mm is considered suitable. Shorter focal lengths tend to produce drop-offs in coverage of the imaged area, especially at corners and especially at far working distance. To minimize losses on the edges, it is generally desirable to have shorter focal distance lenses and a short segment widths.

FIGS. 12A-D illustrate various views of a single lens 1308 from a fresnel lens array (e.g., fresnel lens array 208).

Both the upper 1302 and lower 1304 surfaces of the illustrated lens 1308 have fresnel features formed thereon. The fresnel features on the upper surface 1302 are orthogonal to the fresnel features formed on the lower surface 1304.

The illustrated lens 1308 may be molded as an integral part of the fresnel lens array 208. Alternatively, the illustrated lens 1308 may be formed separately from the rest of the fresnel lens array 208 and adhered to or otherwise secured into the other elements to form the fresnel lens array 208.

Figure 13:
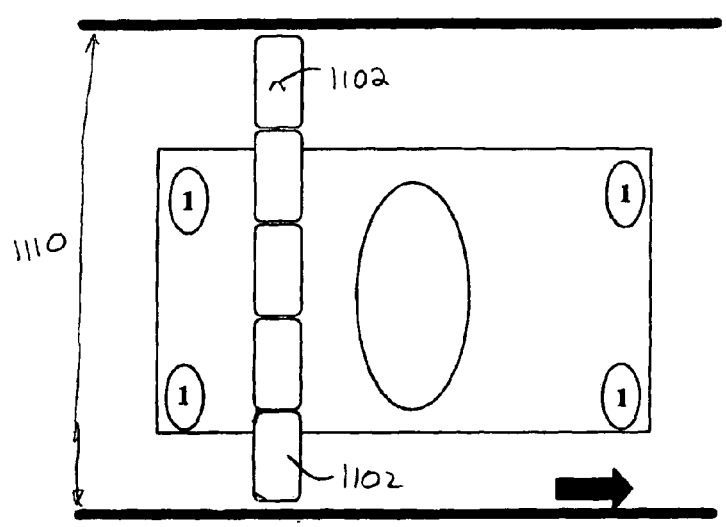
FIG. 13 is a plan view of a document moving along a document path past five optical detector coverage areas.

FIG. 13 is a plan view of a document 108 moving along a document path 1110 past five optical detector coverage areas 1102.

The illustrated document path 1110 is larger than the width of the document 1108 (i.e., the bank note) moving along the path 1110. Since the document 1108 could be closer to either edge of the path 1110 and since a larger or smaller document 1108 may be utilized, it is generally desirable that the detectors be able to cover most (or all) of the document path 1110. Moreover, it is desirable that such coverage be obtained using a minimum number of optical detectors. It also is desirable that the light pipe assembly provide substantially even, unbroken illumination across the entire width of the document path 1110.

The illustrated implementation utilizes five sensors, each adapted to optically cover an approximately 7×12 mm spot at the document path 1110. The 7 mm dimension is taken in the direction of the movement of the document and the 12 mm dimension is taken in the direction of the width of the document path.

A number of embodiments have been described. Nevertheless, it will be understood that various modifications may be made without departing from the spirit and scope of the invention.

For example, the light pipe core can include more than one row of surface features. The surface features can be arranged in a non-orderly fashion and can be positioned in only certain places (but not others) along the upper surface of the light pipe core. The surface features can take a variety of shapes, including cubic, cylindrical, pyramid-shaped with a truncated tip, pyramid-shaped with a rounded tip and others. Indeed, the surface feature may be asymmetrical and irregularly shaped. Each surface feature should define an internally reflective boundary, whose size can be modified from surface feature to surface feature across a light emitting surface.

The sensor arrangement can include any number of light sources and any number of optical detectors. Various parts of the structures described herein may be integrally formed or formed separately and later secured to one another. The optical detectors and/or the light sources may be formed as an integrated linear array.

The various elements may be rearranged in a wide variety of ways. The light pipe assembly could be utilized in reflective or transmissive document acceptors. The light pipe assembly need not be u-shaped. Indeed, a variety of other shapes are possible. For example, the light pipe assembly could be substantially straight, with light input ports at opposite ends thereof.

Similarly, the fresnel lens array could be incorporated into a number of different document acceptors, including either reflective or transmissive document acceptors.

The light sources and/or optical detectors could be positioned on the same side of a document path, but not on the same printed circuit board. Additionally, those components could be positioned on the same circuit board during assembly and then, before the circuit board is installed in the document acceptor, the circuit board could be cut to form two or more smaller circuit boards. It may be desirable that the light sources and optical detectors be positioned approximately in the same plane as one another. In some instances, however, the light sources and optical detectors may be positioned on opposite sides of the document path from one another.

The sizes and shapes of the surface features on the light emitting surface may vary considerably. The rules of progression from one surface feature to the next may vary depending on the effect desired for a particular application.

The number of light input ports at each end of a light pipe assembly can vary. In some implementations, the number of light input ports at one end of the light pipe assembly is different than the number of light input ports at the opposite end of the light pipe assembly.

Accordingly, other implementations are within the scope of the claims.

What is claimed is:

1. A sensor arrangement for a document acceptor using optical transmissive measurements, the sensor arrangement comprising:
    at least one light source located on a first side of a document path and arranged to transmit light around the document path to a second side of the document path, the second side being opposite the first side;
    one or more optical detectors located on the first side of the document path and arranged to receive light sent from the light source and passing through the document path; and
    a light pipe assembly located on the second side of the document path adapted to receive light from the at least one light source located on the first side of the document path and transmit light through the document path to the one or more optical detectors, the at least one light source is arranged such that, when a document is in the document path, light transmitted by the light source to the second side of the document path reaches the second side of the document path substantially without passing through the document;
    wherein the light pipe assembly includes a plurality of surface features with substantially trapezoidal bases.

2. The sensor arrangement of claim 1 further comprising one or more printed circuit boards on the first side of the document path, wherein the at least one light source and the optical detectors are mounted to the one or more printed circuit boards.

3. The sensor arrangement of claim 2 wherein the at least one light source and the optical detectors are mounted to the same printed circuit board.

4. The sensor arrangement of claim 1 wherein the light pipe assembly comprises:
    a first light input port located at a first end of the light pipe assembly and arranged to receive light from one of the at least one light sources;
    a light emitting surface that extends substantially from the first end to a second end of the light pipe assembly; and
    one or more reflective surfaces arranged to reflect light from the first internally reflective boundaries through the light emitting surface,
    wherein the plurality of surface features are positioned on the light emitting surface, wherein each surface feature defines a first internally reflective boundary at a far end of the surface feature relative to the first light input port, wherein light that enters the first input port is directed to the first internally reflective boundaries;
    wherein the first internally reflective boundaries vary in size across the light emitting surface.

5. The sensor arrangement of claim 4 wherein the first internally reflective boundaries increase in size from the first end of the light pipe assembly to the second end of the light pipe assembly.

6. The sensor arrangement of claim 4 further comprising:
    second light input port at the second end of the light pipe assembly and arranged to receive light from a second one of the at least one light sources,
    wherein each surface feature in the light emitting surface defines a second internally reflective boundary at a far end of the surface feature relative to the second light input port,
    wherein light that enters the second light input port is directed to the second internally reflective boundaries,
    wherein the one or more reflective surfaces reflect light from the second internally reflective boundaries through the light emitting surface, and
    wherein the second internally reflective boundaries vary in size across the light emitting surface.

7. The sensor arrangement of claim 6 wherein the second internally reflective boundaries increase in size from the second end of the light pipe assembly to the first end of the light pipe assembly.

8. The sensor arrangement of claim 6 wherein the plurality of the surface features have a pair of substantially parallel sides, one of which is longer than the other.

9. The sensor arrangement of claim 6 wherein the first and second internally reflective boundaries are arranged so as to substantially totally internally reflect the light from the first and second light input ports, respectively.

10. The sensor arrangement of claim 6 wherein the first and second light input ports and the light emitting surface are arranged such that light enters the first or second input ports from a first direction and exits the light emitting surface in a second direction, opposite the first.

11. The sensor arrangement of claim 4 wherein the one or more reflective surfaces are adapted to diffusely reflect light.

12. The sensor arrangement of claim 4 wherein the surface features are substantially pyramid-shaped.

13. The sensor arrangement of claim 4 wherein the light emitting surface spans substantially an entire width of the document path.

14. The sensor arrangement of claim 1 further comprising:
an array of fresnel lenses arranged so that light from the light source passes through the array of fresnel lenses before reaching the optical detectors.

15. The sensor arrangement of claim 9 wherein the array of fresnel lenses comprises:
a first fresnel structure on a first side of the array, the first fresnel structure extending continuously across substantially an entire length of the array; and
a second fresnel structure on a second side of the array, the second fresnel structure having a plurality of fresnel segments, each fresnel segment extending in a direction substantially orthogonal to the first fresnel structure, wherein each fresnel segment corresponds to one of the optical detectors.

16. The sensor arrangement of claim 15 wherein the array of fresnel lenses anamorphically distorts light that passes through it.

17. The sensor arrangement of claim 16 wherein the array of fresnel lenses anamorphically compresses the light that passes through the array.

18. The sensor arrangement of claim 15 wherein the first fresnel structure and the second fresnel structure respectively comprise:
a convex central region; and
a first set of teeth that extend across the array on a first side of the convex central region; and
a second set of teeth that extend across the array on a second side of the convex central region.

19. The sensor arrangement of claim 15 wherein the first fresnel structure is on a surface of the fresnel lens array substantially facing the optical detectors.

20. The sensor arrangement of claim 1 further comprising a lens arranged to collimate light traveling to the optical detectors.

21. The sensor arrangement of claim 20 wherein the lens is an infinite conjugate cylindrical fresnel lens.

22. The sensor arrangement of claim 20 wherein the lens comprises:
a substantially flat side; and
a side with a fresnel structure,
wherein the substantially flat side of the lens forms part of the document path.

23. The sensor arrangement of claim 1 further comprising an infinite conjugate cylindrical fresnel lens arranged to pseudo-collimate the light traveling to the optical detectors.

24. A sensor arrangement for a document acceptor, the sensor arrangement comprising:
a light source;
one or more optical detectors located on a first side of a document path; and
an array of fresnel lenses located on the first side of the document path comprising:
a first fresnel structure on a first side of the array, the first fresnel structure extending continuously across substantially an entire length of the array; and
a second fresnel structure on a second side of the array, the second fresnel structure having a plurality of fresnel segments, each fresnel segment extending in a direction substantially orthogonal to the first fresnel structure, wherein each fresnel segment corresponds to one of the plurality of optical detectors,
wherein light from the light source located on the first side of the document path reaches a second side of the document path substantially without passing through the document path and passes through a light pipe comprising trapezoidal surface features located on the second side of the document path, the light further passing from the second side to the first side substantially through the document path to the array of Fresnel lenses located on the first side of the document path and to the one or more optical detectors located on the first side of the document path.

25. The sensor arrangement of claim 24 wherein the array of fresnel lenses is arranged to anamorphically distort light that passes through the array.

26. The sensor arrangement of claim 24 wherein the array of fresnel lenses is arranged to anamorphically compress light that passes through the array.

27. The sensor arrangement of claim 24 wherein each of the first and second fresnel structures respectively comprises:
a convex central region;
a first set of teeth that extend across the array on a first side of the convex central region; and
a second set of teeth that extend across the array on a second side of the convex central region.

28. The sensor arrangement of claim 27 wherein each tooth comprises:
a first surface that extends from the array in a direction approximately normal relative to a plane of the array; and
a second surface that extends from a distal end of the first surface and is inclined relative to the plane of the array.

29. The sensor arrangement of claim 28 wherein the angle of adjacent second surfaces of at least some of the teeth differ from one another.

30. The sensor arrangement of claim 28 wherein the angle of second surfaces in adjacent teeth of each set increases moving away from the convex central region.

31. The sensor arrangement of claim 24 wherein the first side of the fresnel lens array substantially faces the optical detectors.

32. A light pipe assembly comprising:
a first light input port at a first end of the light pipe assembly, permitting light to enter in a first direction;
a light emitting surface that extends substantially from the first end to a second end of the light pipe assembly, which permits light to exit the light emitting surface in a second direction opposite the first direction;
a plurality of surface features in the light emitting surface, wherein each surface feature defines a first internally reflective boundary at a far end of the surface feature relative to the first light input port, wherein light that enters the first input port is directed to the first internally reflective boundaries; and
one or more reflective surfaces arranged to reflect light from the first internally reflective boundaries through the light emitting surface, and
a second light input port at the second end of the light pipe assembly,
wherein each surface feature in the light emitting surface defines a second internally reflective boundary at a far end of the surface feature relative to the second light input port;

wherein the first internally reflective boundaries vary in size across the light emitting surface and wherein a plurality of the surface features have substantially trapezoidal bases.

33. The light pipe assembly of claim 32 wherein the first internally reflective boundaries increase in size from the first end of the light pipe assembly to the second end of the light pipe assembly.

34. The light pipe assembly of claim 32 comprising a plurality of first light input ports at the first end of the light pipe assembly.

35. The light pipe assembly of claim 32 wherein light that enters the second light input port is directed to the second internally reflective boundaries, wherein the one or more reflective surfaces reflect light from the second internally reflective boundaries through the light emitting surface, and wherein the second internally reflective boundaries vary in size across the light emitting surface.

36. The light pipe assembly of claim 35 wherein the second internally reflective boundaries increase in size from the second end of the light pipe assembly to the first end of the light pipe assembly.

37. The light pipe assembly of claim 35 wherein the substantially trapezoidal bases have a pair of substantially parallel sides, one of which is longer than the other.

38. The light pipe assembly of claim 35 wherein the first and second internally reflective boundaries are arranged so as to substantially totally internally reflect the light from the first and second light input ports, respectively.

39. The light pipe assembly of claim 35 wherein the first and second input ports and the light emitting surface are arranged such that light enters the first or second input ports from a first direction and exits the light emitting surface in a second direction, opposite the first.

40. The light pipe assembly of claim 35 further comprising a plurality of second light input ports at the second end of the light pipe assembly.

41. The light pipe assembly of claim 32 wherein the one or more reflective surfaces are adapted to diffusely reflect light.

42. The light pipe assembly of claim 32 wherein the plurality of surface features are substantially pyramid-shaped.

43. A document validator comprising:
one or more light sources located on a first side of a document path and arranged to transmit light around the document path to a second side of the document path opposite the first side such that when a document is in the document path, light transmitted by the light source to the second side of the document path reaches the second side of the document path substantially without passing through the document;
one or more optical detectors;
a light pipe assembly located at least partially on the second side and adapted to receive light from the one or more light sources located on the first side and transmit light through the document path to the one or more optical detectors, the light pipe assembly comprising:
a first light input port at a first end of the light pipe assembly, the first light input port arranged to receive light from a first one of the light sources;
a light emitting surface that extends substantially from the first end to a second end of the light pipe assembly;
a plurality of surface features in the light emitting surface, wherein each surface feature defines a first internally reflective boundary at a far end of the surface feature relative to the first light input port, wherein light that enters the first input port is directed to the first internally reflective boundaries, at least one of the plurality of surface features having substantially a trapezoidal base; and
one or more reflective surfaces arranged to reflect light from the first internally reflective boundaries through the light emitting surface,
wherein the first internally reflective boundaries vary in size across the light emitting surface; and
a lens arranged to at least partially collimate light that is emitted from the light emitting surface of the light pipe assembly;
wherein the one or more optical detectors are arranged to receive the at least partially collimated light.

44. The document validator of claim 43 comprising a plurality of first light input ports at the first end of the light pipe assembly.

45. The document validator of claim 44 wherein each of the first light input ports is arranged to receive light from at least one of the light sources.

46. The document validator of claim 43 wherein the light pipe assembly further comprises:
a second light input port at the second end of the light pipe assembly, wherein the second light input port is arranged to receive light from a second one of the light sources;
wherein each surface feature in the light emitting surface defines a second internally reflective boundary at a far end of the surface feature relative to the second light input port,
wherein light that enters the second light input port is directed to the second internally reflective boundaries,
wherein the one or more reflective surfaces reflect light from the second internally reflective boundaries through the light emitting surface, and
wherein the second internally reflective boundaries vary in size across the light emitting surface.

47. The document validator of claim 46 comprising a plurality of second light input ports at the second end of the light pipe assembly.

48. The document validator of claim 47 wherein each of the second light input ports is arranged to receive light from at least one of the light sources.

49. The document validator of claim 43 wherein the lens is an infinite conjugate cylindrical fresnel lens.

50. The document validator of claim 43 wherein the lens comprises:
a substantially flat side; and
a side with a fresnel structure,
wherein the substantially flat side of the lens forms part of a document path through the document validator.

* * * * *